US011301306B2

(12) United States Patent
Reed et al.

(10) Patent No.: US 11,301,306 B2
(45) Date of Patent: Apr. 12, 2022

(54) APPARATUS, SYSTEMS, AND METHODS FOR REMOTE SYSTEM BATCH PROCESSING

(71) Applicant: International Business Machines Corporation, Armonk, NY (US)

(72) Inventors: David C. Reed, Tucson, AZ (US); Ronald David Boenig, II, Denver, CO (US); David Michael Shackelford, Tucson, AZ (US)

(73) Assignee: International Business Machines Corporation, Armonk, NY (US)

(*) Notice: Subject to any disclaimer, the term of this patent is extended or adjusted under 35 U.S.C. 154(b) by 411 days.

(21) Appl. No.: 16/584,387

(22) Filed: Sep. 26, 2019

(65) Prior Publication Data

US 2021/0096928 A1    Apr. 1, 2021

(51) Int. Cl.
*G06F 9/46* (2006.01)
*G06F 9/50* (2006.01)
*G06F 9/48* (2006.01)
*G06F 11/14* (2006.01)

(52) U.S. Cl.
CPC .......... *G06F 9/5083* (2013.01); *G06F 9/4881* (2013.01); *G06F 11/1448* (2013.01); *G06F 2201/82* (2013.01)

(58) Field of Classification Search
CPC .. G06F 9/5083; G06F 9/4881; G06F 11/1448; G06F 2201/82
See application file for complete search history.

(56) References Cited

U.S. PATENT DOCUMENTS

| 5,734,818 | A | 3/1998 | Kern et al. |
|---|---|---|---|
| 7,177,992 | B2 | 2/2007 | Kappler |
| 7,240,238 | B2 | 7/2007 | Yanai |
| 8,694,742 | B2 | 4/2014 | Inoue et al. |
| 2018/0024892 | A1 | 1/2018 | Mutha et al. |
| 2019/0095304 | A1 | 3/2019 | Kumarasamy et al. |
| 2020/0150946 | A1* | 5/2020 | Olderdissen ........ G06F 11/1484 |
| 2020/0349036 | A1* | 11/2020 | Sathavalli ........... G06F 11/1464 |

FOREIGN PATENT DOCUMENTS

| CN | 105120003 B | 12/2015 |
|---|---|---|
| CN | 109669816 A | 4/2019 |

* cited by examiner

*Primary Examiner* — Gregory A Kessler
(74) *Attorney, Agent, or Firm* — Kunzler Bean & Adamson

(57) ABSTRACT

Methods that can batch process data on a remote system or disaster recovery (DR) site are disclosed herein. One method includes determining, by a processor, a first performance level for a production site based on a set of first resources for the production site and determining a second performance level for a DR site based on a set of second resources for the DR site. The method further includes allocating a portion of a workload scheduled for processing on the production site to the DR site for processing on the DR site in response to determining that a set of predetermined parameters related to the first performance level, the second performance level, or both the first performance level and the second performance level is satisfied. Apparatus, systems, and computer program products that can include, perform, and/or implement the methods are also disclosed herein.

20 Claims, 11 Drawing Sheets

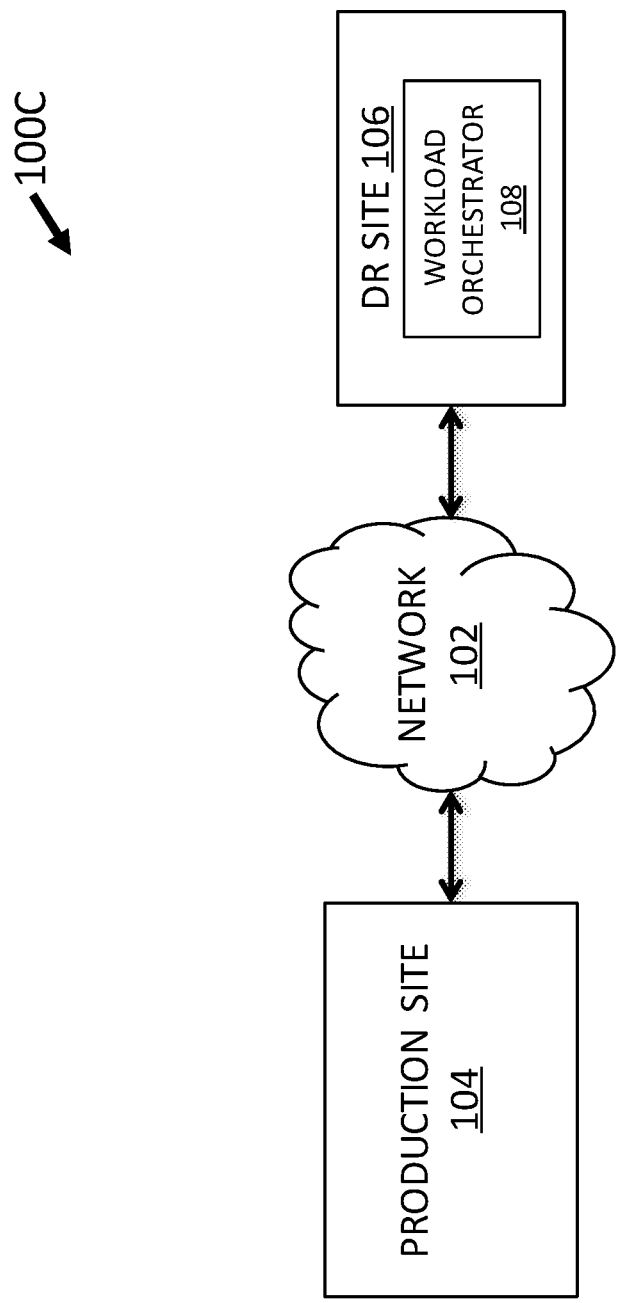

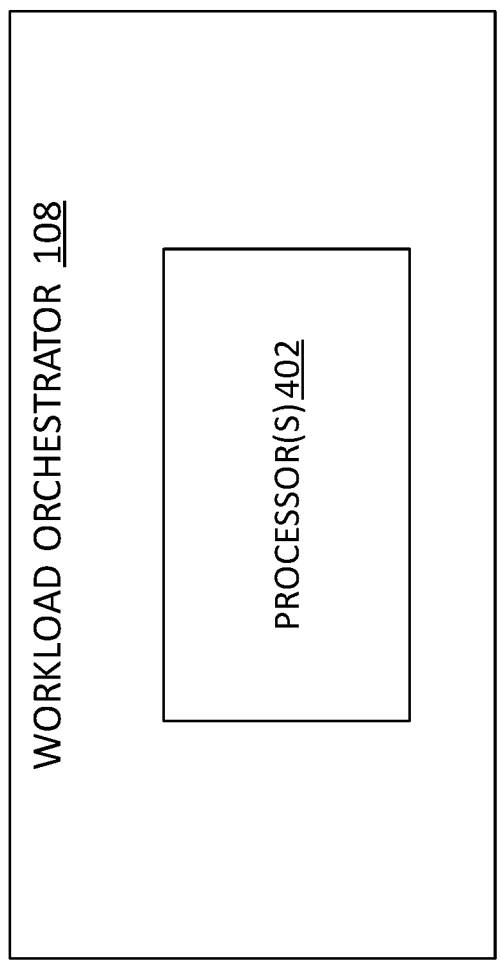

APPARATUS, SYSTEMS, AND METHODS FOR REMOTE SYSTEM BATCH PROCESSING

FIELD

The subject matter disclosed herein relates to computing networks and, more particularly, relates to apparatus, systems, and methods that can batch process data on a remote system.

BACKGROUND

Conventional batch processing operations are typically performed on a production site (e.g., a storage system and/or network). At times of natural disaster or for other reasons, the production site can go offline and/or otherwise become unavailable, which can be referred to as a disaster. If the production site does not include copies of the data stored on the production site, data can be lost, which can be costly in terms of data recovery and/or lost operational time. To ensure that data is not lost during a disaster, many conventional production sites utilize a disaster recovery (DR) site to store copies of the data, which is often referred to as mirroring the data. When not performing data mirroring operations for the production site, resources on the DR site typically sit idle and/or on stand by while the production site is online or functioning properly. In some situations, resources on the DR site can sit idle even when the production site may be operating at a reduced efficiency level and/or is experiencing an increase in latency for various operations.

BRIEF SUMMARY

Apparatus, systems, and methods that can batch process data on a remote system or disaster recovery (DR) site are provided. One apparatus includes a performance module that determines a first performance level for a production site based on a set of first resources for the production site and determines a second performance level for a DR site based on a set of second resources for the DR site. The apparatus further includes a workload module that allocates a portion of a workload scheduled for processing on the production site to the DR site for processing on the DR site in response to determining that a set of predetermined parameters related to one of the first performance level, the second performance level, and both the first performance level and the second performance level is satisfied. In additional or alternative embodiments, at least a portion of the modules includes one or more of a set of hardware circuits, a set of programmable hardware devices, and/or executable code stored on a set of non-transitory computer-readable storage media.

A method includes determining, by a processor, a first performance level for a production site based on a set of first resources for the production site and determining a second performance level for a DR site based on a set of second resources for the DR site. The method further includes allocating a portion of a workload scheduled for processing on the production site to the DR site for processing on the DR site in response to determining that a set of predetermined parameters related to one of the first performance level, the second performance level, and both the first performance level and the second performance level is satisfied.

One computer program product includes a computer-readable storage medium including program instructions embodied therewith. The program instructions are executable by a processor to cause the processor to determine a first performance level for a production site based on a set of first resources for the production site and determine a second performance level for a DR site based on a set of second resources for the DR site. The program instructions further cause the processor to allocate a portion of a workload scheduled for processing on the production site to the DR site for processing on the DR site in response to determining that a set of predetermined parameters related to one of the first performance level, the second performance level, and both the first performance level and the second performance level is satisfied.

BRIEF DESCRIPTION OF THE DRAWINGS

So that at least some advantages of the technology may be readily understood, more particular descriptions of the embodiments briefly described above are rendered by reference to specific embodiments that are illustrated in the appended drawings. Understanding that the drawings included herein only depict some embodiments, the embodiments discussed herein are therefore not to be considered as limiting the scope of the technology. That is, the embodiments of the technology that are described and explained herein are done with specificity and detail utilizing the accompanying drawings, in which:

FIGS. 1A through 1C are block diagrams of various embodiments of a storage system;

FIG. 4 is a block diagram of one embodiment of a workload orchestrator included in a storage system of FIGS. 1A through 1C;

DETAILED DESCRIPTION

Figure 1A:
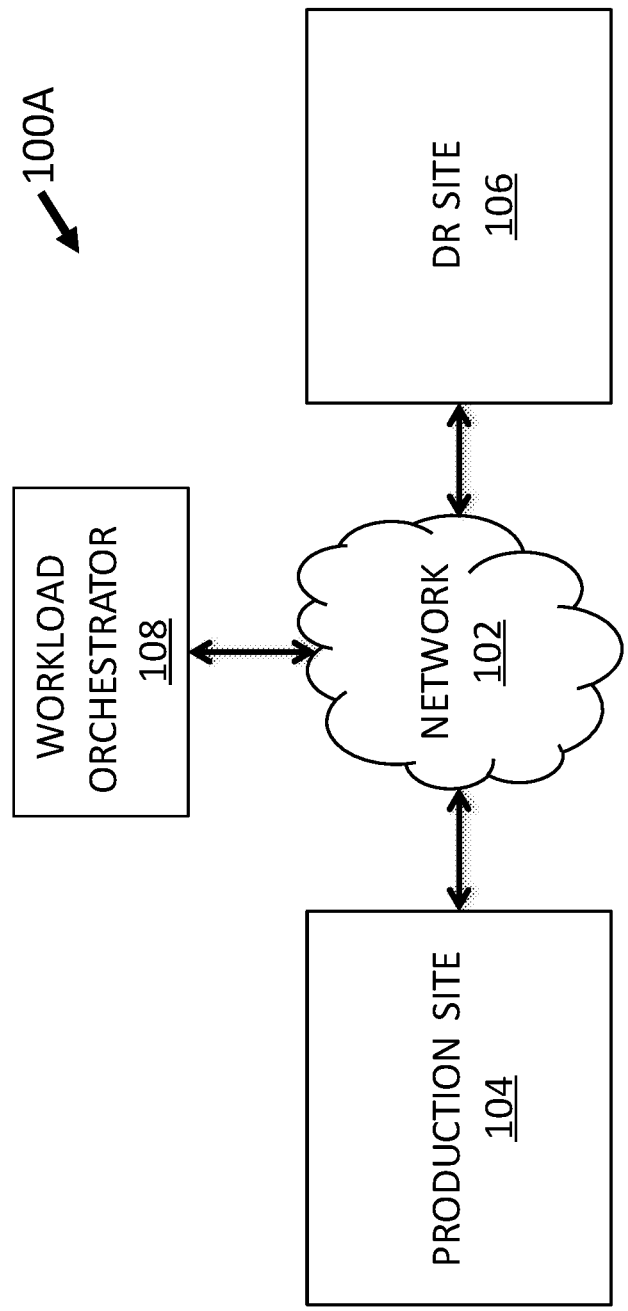

Disclosed herein are various embodiments providing apparatus, systems, methods, and computer program products that can accelerate replication of file metadata on different sites. Notably, the language used in the present disclosure has been principally selected for readability and instructional purposes, and not to limit the scope of the subject matter disclosed herein in any manner.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "including," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more," unless expressly specified otherwise.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Further, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present technology may be a system, a method, and/or a computer program product. The computer program product may include a computer-readable storage medium (or media) including computer-readable program instructions thereon for causing a processor to carry out aspects of the present technology.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove including instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fibre-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present technology may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). To perform aspects of the present technology, in some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry.

Aspects of the present technology are described herein with reference to flowchart illustrations and/or block diagrams of methods, apparatus (systems), and computer program products according to embodiments of the technology. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium including instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technology. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

To more particularly emphasize their implementation independence, many of the functional units described in this specification have been labeled as modules. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The schematic flowchart diagrams and/or schematic block diagrams in the Figures illustrate the architecture, functionality, and operation of possible implementations. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Although various arrow types and line types may be employed in the flowchart and/or block diagrams, they are understood not to limit the scope of the corresponding embodiments. Indeed, some arrows or other connectors may be used to indicate only an exemplary logical flow of the depicted embodiment.

The description of elements in each figure below may refer to elements of proceeding figures. For instance, like numbers can refer to similar elements in all figures, including alternate embodiments of similar elements.

Figure 1B:
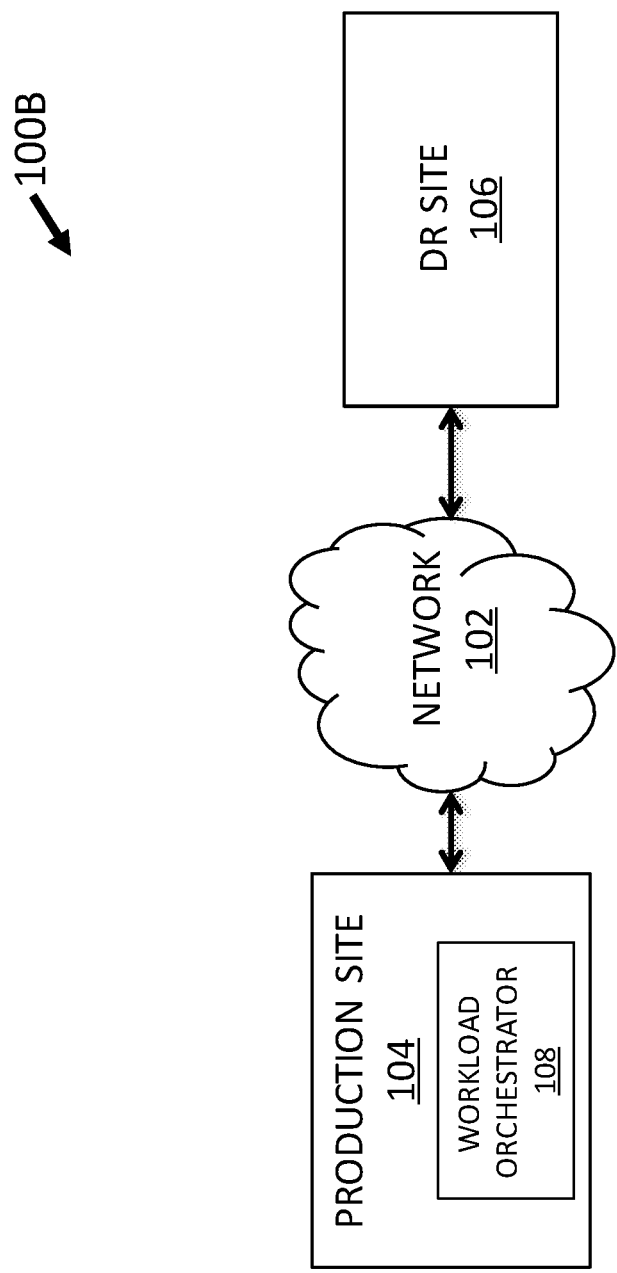

With reference now to the figures, FIGS. 1A through 1C are block diagrams illustrating various embodiments of storage systems 100A, 100B, and 100C, respectively. Storage systems 100A, 100B, and 100C can also be considered storage networks and herein can simply be referred individually, in various groups, or collectively as storage system(s) 100. At least in the illustrated embodiment, the storage system 100A includes, among other components, a network 102 coupling a production site 104 (e.g., a primary site/system), a disaster recovery (DR) site 106 (e.g., a remote site/system, a secondary site/system, a backup site/system, etc.), and a workload orchestrator 108 to one another.

The network 102 may be any suitable wired and/or wireless network 102 (e.g., public and/or private computer networks in any number and/or configuration (e.g., the Internet, an intranet, a cloud network, etc.)) that is known or developed in the future that enables the production site 104 and the DR site 106 to be coupled to and/or in communication with one another and/or to share resources. In various embodiments, the network 102 can include a cloud network (IAN), a SAN (e.g., a storage area network, a small area network, a server area network, and/or a system area network), a wide area network (WAN), a local area network (LAN), a wireless local area network (WLAN), a metropolitan area network (MAN), an enterprise private network (EPN), a virtual private network (VPN), and/or a personal area network (PAN), among other examples of computing networks and/or or sets of computing devices connected together for the purpose of sharing resources.

Figure 2:
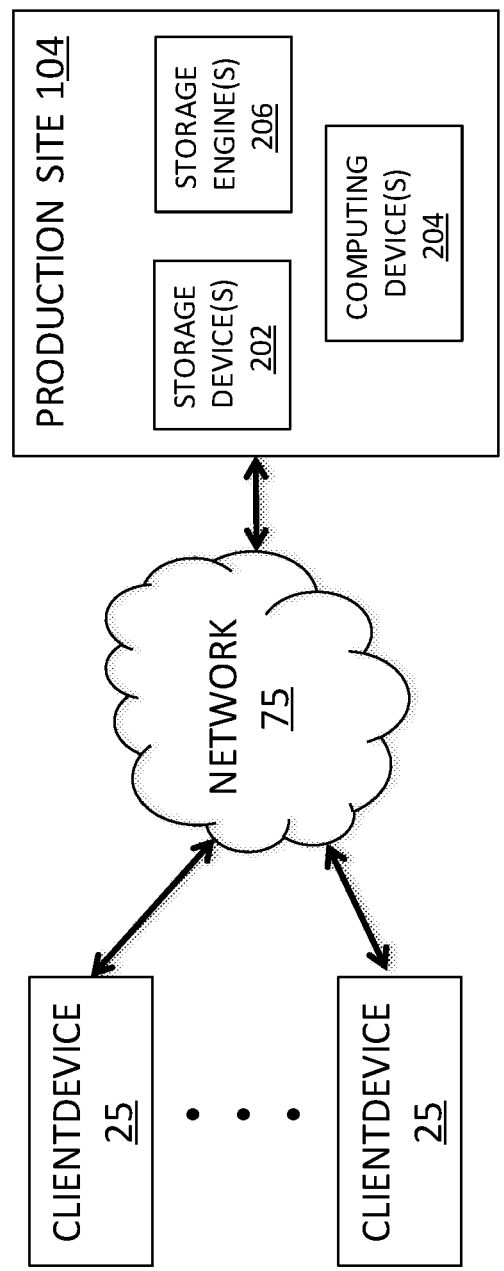
FIG. 2 is a block diagram of one embodiment of a production site included in a storage system of FIGS. 1A through 1C.

Referring to FIG. 2, FIG. 2 is a block diagram of one embodiment of a production site 104 (e.g., primary system) included in the storage system 100 coupled to and/or in communication with a set of client devices 25. A client device 25 can be any computing hardware and/or software (e.g., a thick client, a thin client, or hybrid thereof) capable of accessing the production site 104 via a network 75, which may be any type of network that is known or developed in the future.

Each client device 25, as part of its respective operation, relies on sending I/O requests to the production site 104 to write data, read data, and/or modify data. Specifically, each client device 25 can transmit I/O requests to read, write, store, communicate, propagate, and/or transport instructions, data, computer programs, software, code, routines, etc., to the production site 104 and may comprise at least a portion of a client-server model. In general, the production site 104 can be accessed by the client device(s) 25 and/or communication with the production site 104 can be initiated by the client device(s) 25 through a network socket (not shown) utilizing one or more inter-process networking techniques.

At least in the illustrated embodiment, the production site 104 includes, among other components, a set of storage devices 202, a set of computing devices 204, and a set of storage engines 206 coupled to and/or in communication with one another. The storage devices 202 (also simply referred individually, in various groups, or collectively as storage device(s) 202) may be any suitable type of device and/or system that is known or developed in the future that can store computer-useable data. In various embodiments, a storage device 202 may include one or more non-transitory computer-usable mediums (e.g., readable, writable, etc.), which may include any non-transitory and/or persistent apparatus or device that can contain, store, communicate, propagate, and/or transport instructions, data, computer programs, software, code, routines, etc., for processing by or in connection with a computer processing device.

In some embodiments, a storage device 202 may be implemented as a direct-access storage device (DASD). A storage device 202, in further embodiments, may include other types of non-transitory memory such as, for example, flash memory (e.g., a solid-state devices (SSD) or other non-volatile storage devices that store persistent data), a dynamic random access memory (DRAM) device, an enhanced dynamic random access memory (EDRAM) device, a static random access memory (SRAM) device, a hard disk drive (HDD), a near-line drive, tape drive (e.g., magnetic and/or virtual), and/or other type(s) (e.g., non-volatile and/or persistent) of memory devices, etc. that are possible and contemplated herein.

A set of computing devices 204 (also simply referred individually, in various groups, or collectively as computing device(s) 204) may include any type of hardware and/or software that is known or developed in the future that can perform computing operations. In various embodiments, the computing device(s) 204 can perform I/O operations related to one or more suitable services and/or applications, which can be any service and/or application that is known or developed in the future.

A set of storage engines 206 (also simply referred individually, in various groups, or collectively as storage engine(s) 206) may include non-volatile/persistent hardware and/or software configured to perform and/or facilitate long-term data storage operations on the storage devices 202, including, but not limited to, data archiving, data backup, data mirroring, replicating data, etc. For instance, a storage engine 206 may include non-volatile and/or persistent hardware and/or software to perform long-term data storage operations on the storage devices 202, which may include write operations, read operations, read-write operations, etc., among other operations that are possible and contemplated herein. In various embodiments, a storage engine 206 may communicate with the DR site 106 and/or a storage engine 306 in the DR site 106 to mirror, copy, and/or recover data between the production site 104 and the DR site 106, as discussed elsewhere herein.

In various embodiments, a storage engine 206 may include any type of hardware and/or software that is known or developed in the future that can receive I/O requests (e.g., write request, read request, and/or read-write request, etc.) from the client device(s) 25 and perform corresponding I/O operations (e.g., write operations, read operations, and/or read-write operations, etc.) on the set of storage devices 202 in response thereto. A storage engine 206 may further include hardware and/or software for executing instructions in one or more applications to manage storage operations on the production site 104 and/or the functionality of the set of storage devices 202.

In various embodiments, the storage engine(s) 206 can establish an initial replication relationship with the DR site 106 utilizing an initial replication mode. The storage engine (s) 206 may further include hardware and/or software to generate snapshots of the data, sets of data, subsets of data, etc. stored in the storage device(s) 202 and transmit the storage snapshots to the DR site 106 so that the data stored on the production site 104 is mirrored/copied to the DR site 106.

Figure 3:
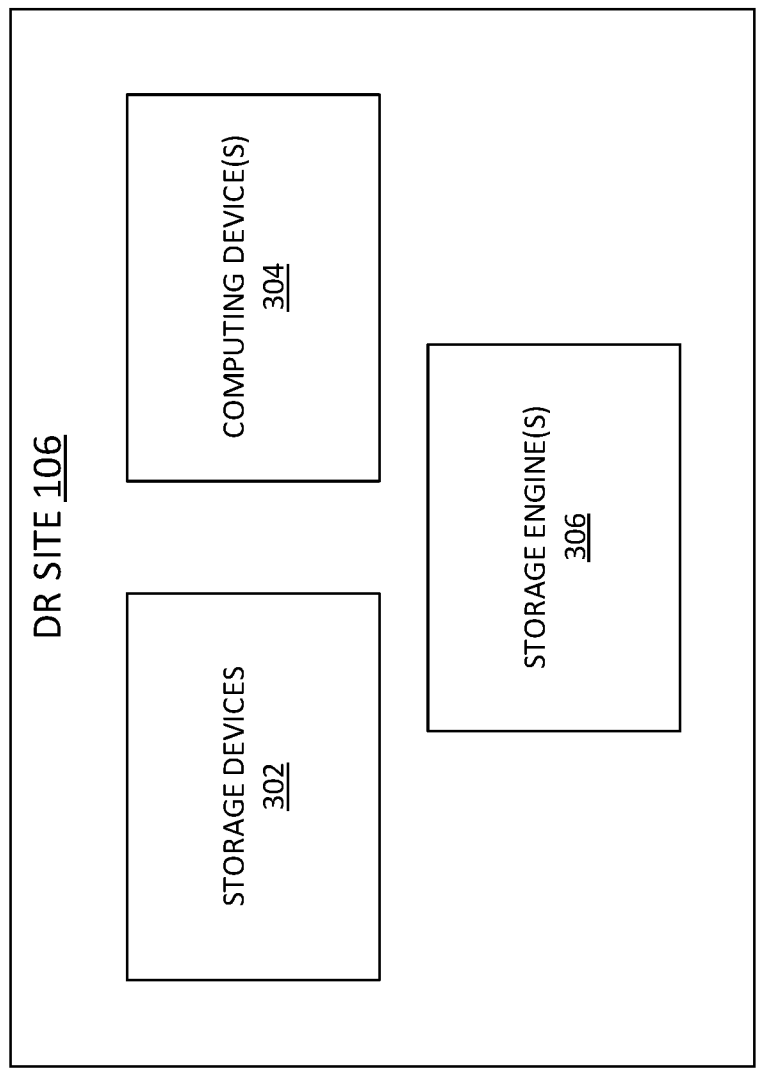
FIG. 3 is a block diagram of one embodiment of a disaster recovery (DR) site included in a storage system of FIGS. 1A through 1C.

With reference to FIG. 3, FIG. 3 is a block diagram of one embodiment of a DR site 106 (e.g., secondary or backup site system) included in a storage system/network 100. At least in the illustrated embodiment, the DR site 106 includes, among other components, a set of storage devices 302 and a set of computing devices 304 coupled to and/or in communication with one another similar to the set of storage devices 202 and the computing device(s) 204 in the data production site 104 discussed herein with reference to FIG. 2. The DR site 106 further includes a set of storage engines 306 (also simply referred individually, in various groups, or collectively as storage engine(s) 306) that may include any type of hardware and/or software that is known or developed in the future that can perform replication operations for the production site 106 on the storage devices 302.

A storage engine 306 may include hardware and/or software for executing instructions in one or more applications to manage the DR site 106 and/or the functionality of the set of storage devices 302. In various embodiments, the storage engine(s) 306 may include hardware and/or software to receive the storage snapshot(s) from the data production site 104, which is/are a copy of the storage snapshot(s) on the data production site 104 so that the data stored on the data production site 104 is mirrored/copied to the DR site 106 (e.g., the storage devices 302 and/or at one or more suitable other storage locations on the DR site 106).

Referring now to FIG. 4, FIG. 4 is a diagram of one embodiment of a workload orchestrator 108 that can manage the exchange of workload data (e.g., data batch processing) between the production site 104 and the DR site 106. At least in the illustrated embodiment, a workload orchestrator 108 may include, among other components, one or more processors 402 coupled to and/or in communication with one another, the data production site 104, and the DR site 106.

Figure 5A:
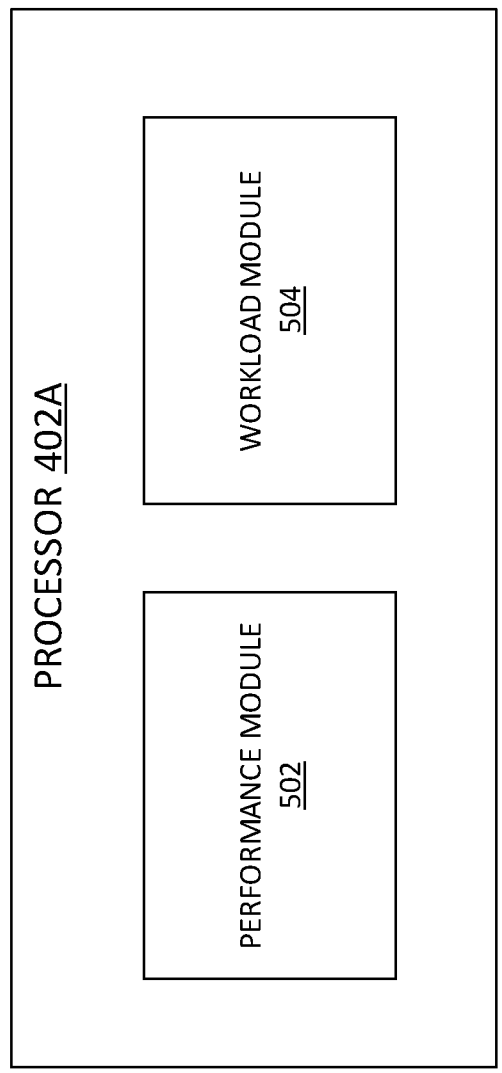
FIGS. 5A and 5B are block diagrams of various embodiments of a processor included in the workload orchestrator of FIG. 4.

With reference to FIG. 5A, FIG. 5A is a block diagram of one embodiment of a processor 402A that can be included in a workload orchestrator 108. At least in the illustrated embodiment, the processor 402A includes, among other components, a performance module 502 and a workload module 504 coupled to and/or in communication with one another.

A performance module 502 may include any suitable hardware and/or software that can determine the performance level of one or more storage networks and/or systems (e.g., storage system/network 100). In various embodiments, the performance module 502 is configured to determine the performance level of the production site 104 and/or the DR site 106.

In some embodiments, the performance module 502 is configured to determine the performance level of the production site 104 based on a set of predetermined parameters and/or conditions for and/or related to a set of resources residing on the production site 104. In various embodiments, the set of predetermined parameters/conditions can be related to, for example, the storage device(s) 202, the computing device(s) 204, and/or the storage engine(s) 206, etc., among other resources that can reside on the production site 104.

In additional or alternative embodiments, the performance module 502 is configured to determine the performance level of the DR site 106 based on a set of predetermined parameters and/or conditions for and/or related to a set of resources residing on the DR site 106. In various embodiments, the set of predetermined parameters/conditions can be related to, for example, the storage devices 302, the computing device(s) 304, and/or the storage engine(s) 306, etc., among other resources that can reside on the DR site 106.

In some further embodiments, the performance module 502 is configured to determine the performance level of the production site 104 and the performance level of the DR site 106 based on a set of predetermined parameters and/or conditions for and/or related to a set of resources residing on the production site 104 and/or a set of resources residing on the DR site 106. In various embodiments, the set of predetermined parameters/conditions can be related to, for example, the storage device(s) 202, the computing device(s) 204, and/or the storage engine(s) 206, the storage devices 302, the computing device(s) 304, and/or the storage engine(s) 306, etc., among other resources that can reside on the production site 104 and/or the DR site 106 that are possible and contemplated herein.

In additional or alternative embodiments, the performance module 502 is configured to determine the performance level of the production site 104 based on a set of predetermined parameters related to a set of non-metric parameters for the DR site 106. In further additional or alternative embodiments, the performance module 502 is configured to determine the performance level of the DR site 106 based on a set of predetermined parameters related to a set of non-metric parameters for the DR site 106.

A workload module 504 may include any suitable hardware and/or software that can allocate a portion of a workload scheduled for processing on the production site 104 to the DR site 106 for performance and/or processing on the DR site 106. In various embodiments, the workload module 504 is configured to allocate performance of the workload from production site 104 to the DR site 106 in response to a determination that a set of predetermined parameters on and/or related to the performance level of the production site 104 and/or the performance level of the DR site 106 being satisfied. In other words, the workload module 504 can facilitate transferring a portion of a workload from production site 104 to the DR site 106 for processing thereon upon a determination that doing such would increase the efficiency of processing the portion of the workload (e.g., decrease the overall processing time of the workload, etc.).

Figure 5B:
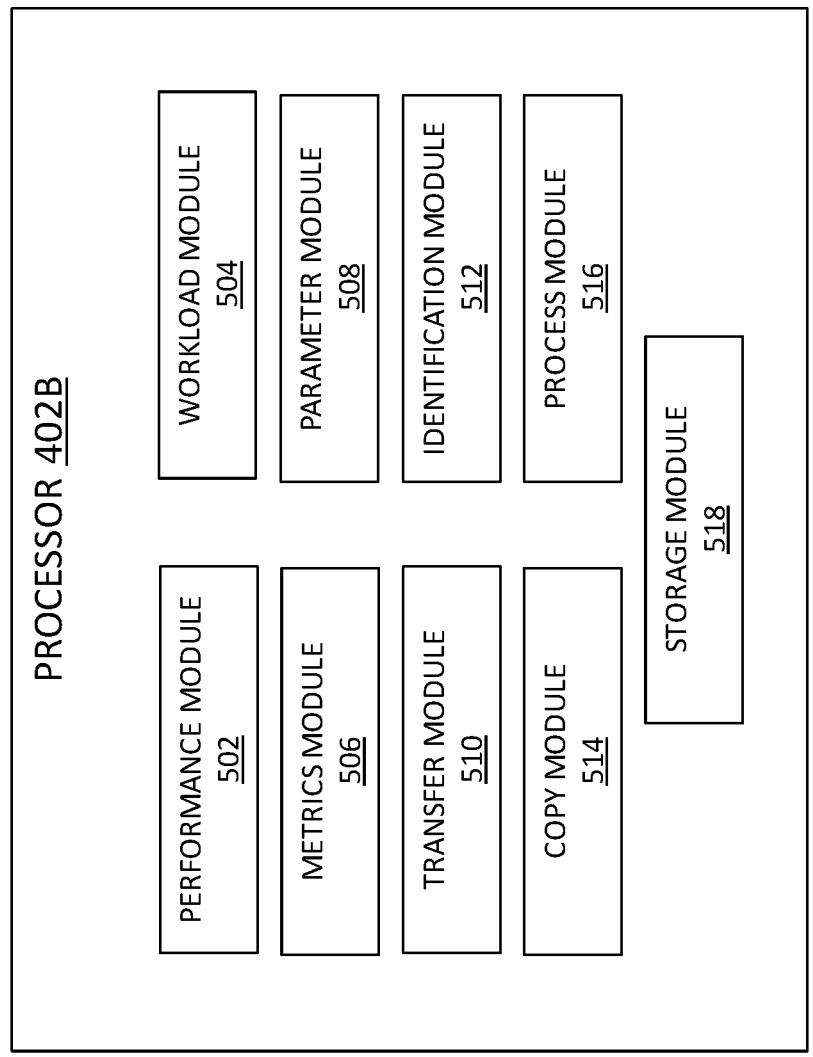

Referring to FIG. 5B, FIG. 5B is a block diagram of another embodiment of a processor 402B that can be included in a workload orchestrator 108. In various embodiments, the processor 402B includes a performance module 502 and a workload module 504 coupled to and/or in communication with one another similar to the embodiment of the processor 402A discussed above with reference to FIG. 5A. At least in the illustrated embodiment, the processor 402B further includes, among other components, a metrics module 506, a parameter module, a transfer module 510, an identification module 512, a copy module 514, a process module 516, and a storage module 518.

A metrics module 506 may include any suitable hardware and/or software that can determine and/or identify a set of metrics on one or more computing devices and/or systems. In various embodiments, a metrics module 506 can determine one or more metrics on the production site 104 and/or the DR site 106.

In some embodiments, a metric can include any suitable measureable attribute of and/or condition in a computing network, computing system, and/or computing device. Example metrics can include, but are not limited to, a quantity of devices (e.g., storage devices, communication channels, storage engines, processors, controllers, switches, etc., among other devices that are possible and contemplated herein) on the production site 104 and/or the DR site 106, a speed/rate of processing on the production site 104 and/or the DR site 106, an amount of storage space on the production site 104 and/or the DR site 106, and/or a data transfer speed/rate between the production site 104 and/or the DR site 106, a location of data stored on one or more resources and/or devices on the production site 104 and/or the DR site 106, etc. among other attributes and/or conditions that are possible and contemplated herein.

In additional or alternative embodiments, a metric can include a comparison of any suitable measureable attribute of and/or condition between two or more computing networks, two or more computing systems, and/or two or more computing devices. Example comparisons include, but are not limited to, an amount of storage space available on the DR site 106 (e.g., in one or more of the storage devices 302) is greater than or equal to an amount of storage space consumed by a portion of a workload that is subject to allocation from the production site 104 to the DR site 106, a set of storage devices 302 on the DR site 106 that is separate from a set of other storage devices 302 on the DR site 106 that is mirroring data corresponding to the data in the portion of the workload that is subject to allocation from the production site 104 to the DR site 106 includes sufficient available storage space to store the data in the portion of the workload, one or more devices and/or resources residing on the DR site 106 (e.g., one or more computing device(s) 304 and/or one or more storage engines 306, etc.) currently include more processing bandwidth and/or is operating at a greater speed/rate than one or more devices residing on the production site 104 (e.g., one or more computing device(s) 204 and/or one or more storage engines 206, etc.), one or more devices and/or resources residing on the DR site 106 (e.g., one or more storage devices 302, etc.) includes a greater amount of available storage than one or more devices and/or resources residing on the production site 104 (e.g., one or more storage devices 202, etc.), and processing the portion of the workload that is subject to allocation from the production site 104 to the DR site 106 on the DR site 106 would currently consume or take less time than processing the portion of the workload on the production site 104, among other comparisons of suitable measureable attributes of and/or conditions between two or more computing networks, two or more computing systems, and/or two or more computing devices that are possible and contemplated herein.

Once determined, a metrics module 506 can transmit the set of metrics to a parameter module 508. Further, the set of metrics can be utilized by the parameter module 508 to determine whether a set of parameters is satisfied.

A parameter module 508 may include any suitable hardware and/or software that can determine whether a set of predetermined parameters for and/or related to one or more computing devices and/or systems is satisfied. In some embodiments, a parameter module 508 can determine whether a set of predetermined parameters based on one or more metrics for the production site 104 and/or the DR site 106 and/or a comparison of metrics has been satisfied. In additional or alternative embodiments, a parameter module 508 can determine whether a set of predetermined parameters based on one or more non-metrics related to the production site 104 and/or the DR site 106 has been satisfied.

A set of parameters may include any suitable parameter or plurality of parameters related to the set of resources residing on the production site 104 and/or to the set of resources residing on the DR site 106 that can determine and/or assist in determining the performance level of the production site 104 and/or the performance level of the DR site 106. In some embodiments, the set of parameters includes one or more predetermined parameters that are satisfied or not satisfied based on one or more individual current conditions, operations, and/or workloads being performed on the production site 104 and/or on the DR site 106 and/or are based on a comparison of one or more current conditions, operations, and/or workloads between the production site 104 and the DR site 106.

A set of predetermined parameters based on individual and/or comparable current conditions, operations, and/or workloads for the production site 104 and/or the DR site 106 can include any suitable current condition(s), operation(s), and/or workload(s) that can determine and/or assist in determining the individual performance level(s) and/or comparative performance level of the production site 104 and/or the DR site 106. Some non-limiting examples of a predetermined parameter based on individual and/or comparable current conditions, operations, and/or workloads for the production site 104 and/or the DR site 106 can include, but are not limited to, a quantity of communication channels between the production site 104 and the DR site 106 is greater than or equal to a threshold quantity of communication channels, a data transfer rate between the production site 104 and the DR site 106 is greater than or equal to a threshold transfer rate, one or more devices and/or resources residing on the production site 104 (e.g., one or more computing device(s) 204 and/or one or more storage engines 206, etc.) include a processing bandwidth and/or is operating at a speed or rate that is less than or equal to a threshold processing bandwidth, speed, and/or rate for the particular device(s) and/or resource(s), an amount of storage space available on the DR site 106 (e.g., in one or more of the storage devices 302) is greater than or equal to an amount of storage space consumed by a portion of a workload that is subject to allocation from the production site 104 to the DR site 106, a set of storage devices 302 on the DR site 106 that is separate from a set of other storage devices 302 on the DR site 106 that is mirroring data corresponding to the data in the portion of the workload that is subject to allocation from the production site 104 to the DR site 106 includes sufficient available storage space to store the data in the portion of the workload, one or more devices and/or resources residing on the DR site 106 (e.g., one or more computing device(s) 304 and/or one or more storage engines 306, etc.) currently include more processing bandwidth and/or is operating at a greater speed/rate than one or more devices residing on the production site 104 (e.g., one or more computing device(s) 204 and/or one or more storage engines 206, etc.), one or more devices and/or resources residing on the DR site 106 (e.g., one or more storage devices 302, etc.) includes a greater amount of available storage than one or more devices and/or resources residing on the production site 104 (e.g., one or more storage devices 202, etc.), the operating speed of one or more connections between devices is faster on the DR site 106 than one or more connections between devices on the production site 106 (e.g., a fiber connection (FICON) is available on the DR site 106 and not available on the production site 104), a determination that transferring at least a portion of the workload from the production site 104 to the DR site 106 would reduce the amount of work on the production site 104 sufficient to free-up one or more resources on the production site 104 and allow one or more tasks/operations on the production site 104 to be processed faster and/or in a smaller amount of time, and processing the portion of the workload that is subject to allocation from the production site 104 to the DR site 106 on the DR site 106 would currently consume or take less time than processing the portion of the workload on the production site 104 (e.g., time verses time and/or the amount of workload that is accomplished is greater than the increase in overhead, etc.), among other suitable current condition(s), operation(s), and/or workload(s) that can determine and/or assist in determining the performance level of the production site 104 and/or the performance level of the DR site 106 that are possible and contemplated herein.

In various embodiments, a predetermined parameter is satisfied in response to the metric(s) related to the current condition(s), operation(s), and/or workload(s) defining the predetermined parameter for the production site 104 and/or the DR site 106 being TRUE. Alternatively, a predetermined parameter is not satisfied in response to the metric(s) related to the current condition(s), operation(s), and/or workload(s) defining the predetermined parameter for the production site 106 and/or the DR site 106 being FALSE.

A threshold quantity of communication channels between the production site 104 and the DR site 106 may include any suitable quantity of communication channels that can improve the overall efficiency at which the portion of the workload that is subject to allocation from the production site 104 to the DR site 106 is processed. Similarly, a threshold transfer rate may include any suitable transfer rate or speed that can improve the overall efficiency at which the portion of the workload that is subject to allocation from the production site 104 to the DR site 106 is processed. Moreover, a threshold processing bandwidth may include any suitable processing bandwidth, rate, and/or speed that indicates that the device(s) and/or resource(s) on the production site 104 are operating at a reduced speed, are operating at an inefficient level, and/or are experiencing an amount of latency, the correction of which can result in an improvement in the overall efficiency at which the portion of the workload that is subject to allocation from the production site 104 to the DR site 106 is processed. Here, improving the overall efficiency at which the portion of the workload that is subject to allocation from the production site 104 to the DR site 106 is processed can include reducing the overall processing time and/or reducing the completion time for the workload, among other efficiencies that are possible and contemplated herein.

In additional or alternative embodiments, a set of parameters may include one or more non-metric parameters. A non-metric parameter may include one or more predetermined parameters that are satisfied or not satisfied based on a type of client, a particular client, a type of data, particular data, maintaining a set of service level agreements (SLAs), one or more times of day (e.g., one or more critical activities for a particular client occurs at certain/different time(s) of day (e.g., different opening times of various stock markets around the globe for a brokerage house, etc.)), and/or maintaining a set of policies (e.g., confidentiality of data, General Data Protection Regulation (GDPR) restrictions, restrictions on who or what is allowed to process and/or view the data, one or more geographic restrictions, etc.), among other non-metric parameters that are possible and contemplated herein.

A predetermined parameter based on a type of client may include any suitable characteristic or feature that can distinguish two or more different types of client. In some embodiments, the predetermined parameter can provide a priority level, ranking, and/or hierarchy for the various different types of clients, which can be based on any suitable distinguishing characteristic/feature between client types. Here, the predetermined parameter can be satisfied in response to determining that the client associated with the portion of the workload that is subject to allocation from the production site 104 to the DR site 106 includes a priority level, ranking, and/or hierarchy that is greater than or equal to a predetermined priority level, ranking, and/or hierarchy. Alternatively, the predetermined parameter may not be satisfied in response to determining that the client associated with the portion of the workload includes a priority level, ranking, and/or hierarchy that is less than the predetermined priority level, ranking, and/or hierarchy.

A predetermined parameter based on a particular client may include any suitable characteristic or feature that can identify and/or distinguish between clients. In some embodiments, the predetermined parameter can provide a priority level, ranking, and/or hierarchy for various individual clients, which can be based on any suitable characteristic/feature of a particular client. Here, the predetermined parameter can be satisfied in response to determining that the client associated with the portion of the workload that is subject to allocation from the production site 104 to the DR site 106 includes a priority level, ranking, and/or hierarchy that is greater than or equal to a predetermined priority level, ranking, and/or hierarchy. Alternatively, the predetermined parameter may not be satisfied in response to determining that the client associated with the portion of the workload includes a priority level, ranking, and/or hierarchy that is less than the predetermined level, ranking, and/or hierarchy.

A predetermined parameter based on a type of data may include any suitable characteristic or feature that can distinguish two or more different types of data. In some embodiments, the predetermined parameter can provide a priority level, ranking, and/or hierarchy for various different types of data, which can be based on any suitable distinguishing characteristic/feature between data types. Here, the predetermined parameter can be satisfied in response to determining that the data included the portion of the workload that is subject to allocation from the production site 104 to the DR site 106 includes a priority level, ranking, and/or hierarchy related to the type of data that is greater than or equal to a predetermined priority level, ranking, and/or hierarchy. Alternatively, the predetermined parameter may not be satisfied in response to determining that the data included in the portion of the workload includes a priority level, ranking, and/or hierarchy related to the type of data that is less than the predetermined priority level, ranking, and/or hierarchy.

A predetermined parameter based on particular data may include any suitable characteristic or feature that can identify and/or distinguish between data. In some embodiments, the predetermined parameter can provide a priority level, ranking, and/or hierarchy for various data, which can be based on any suitable characteristic/feature of a particular data. Here, the predetermined parameter can be satisfied in response to determining that the data included the portion of the workload that is subject to allocation from the production site 104 to the DR site 106 includes a priority level, ranking, and/or hierarchy assigned to it that is greater than or equal to a predetermined priority level, ranking, and/or hierarchy. Alternatively, the predetermined parameter may not be satisfied in response to determining that the data included in the portion of the workload includes a priority level, ranking, and/or hierarchy assigned to it that is less than the predetermined priority level, ranking, and/or hierarchy.

A predetermined parameter based on maintaining one or more SLAs may include maintaining any suitable set of commitments between a service provider and a service user. Example commitments between a service provider and a service user can include, but are not limited to, a quality of service, availability of service, and/or responsibilities of service, etc., among other commitments that are possible and contemplated herein. Here, the predetermined parameter can be satisfied in response to a determination that processing the portion of the workload on the DR site 106 would maintain the commitment between a service provider and a service user and/or that processing the portion of the workload on the production site 104 would not maintain the commitment between the service provider and the service user. Alternatively, the predetermined parameter may not be satisfied in response to a determination that processing the portion of the workload on the DR site 106 would not maintain the commitment between the service provider and the service user and/or that processing the portion of the workload on the production site 104 would maintain the commitment between the service provider and the service user.

A predetermined parameter based on maintaining one or more policies may include maintaining any suitable set of conditions with respect to a computing system and/or the data processed and/or stored therein. Example conditions can include, but are not limited to, a policy that data is to be processed before the expiration of a threshold maximum amount of time, a policy that data is to be processed at a rate greater than a threshold minimum rate, a policy that data is to be processed at the fastest rate, and/or a policy that data is to be processed in the least amount of time as possible, etc., among other policies that are possible and contemplated herein. Here, the predetermined parameter can be satisfied in response to a determination that processing the portion of the workload on the DR site 106 would maintain the set of conditions defining the one or more policies for the computing system and/or the data processed and/or stored therein or that processing the portion of the workload on the production site 104 would violate the set of conditions defining the one or more policies for the computing system and/or the data processed and/or stored therein. Alternatively, the predetermined parameter may not be satisfied in response to a determination that processing the portion of the workload on the DR site 106 would violate the set of conditions defining the one or more policies for the computing system and/or the data processed and/or stored therein and/or that processing the portion of the workload on the production site 104 would maintain the set of conditions defining the one or more policies for the computing system and/or the data processed and/or stored therein.

In various embodiments, a parameter module 508 can communicate with a workload module 504 and inform the workload module 504 whether a set of parameters for and/or related to the production site 104 and/or the DR site 106 is satisfied. In response to the set of parameters not being satisfied, the workload module 504 can notify a device on the production site 104 (e.g., a computing device 204) to continue and/or maintain processing the portion of the workload on the production site 104. In response to the set of parameters being satisfied, the workload module 504 can notify a transfer module 510 of such satisfaction.

A transfer module 510 may include any suitable hardware and/or software that can transfer data between a production site 104 and a DR site 106. In some embodiments, a transfer module 510 can transfer a portion of a workload, as allocated by a workload module 504, from production site 104 to a DR site 106 for processing on the DR site 106.

The allocated portion of the workload may be transferred from the production site 104 to the DR site 106 by the transfer module 510 utilizing any technique and/or protocol that is known or developed in the future. In various embodiments, the portion of the workload may be arranged and/or grouped into a set of batches of data (e.g., one or more data batches) that are transferred from the production site 104 to the DR site 106, among other techniques and/or protocols that are possible and contemplated herein.

In some embodiments, the one or more batches of data included in the portion of the workload transferred from the production site 104 to the DR site 106 corresponds to data already mirrored (e.g., a stored copy) on the DR site 106. Further, the portion of the workload transferred from the production site 104 to the DR site 106 can include instructions for processing the one or more batches data on the DR site 106 using the data already stored (e.g., mirrored) on the DR site 106.

In additional or alternative embodiments, a transfer module 510 can transfer data that has been processed and/or transformed, as discussed elsewhere herein, from the DR site 106 to the production site 104. The processed/transformed data may be transferred from the DR site 106 to the production site 104 by the transfer module 510 utilizing any technique and/or protocol that is known or developed in the future.

An identification module 512 can include any suitable hardware and/or software that can identify each available device (e.g., computing device(s) 304 and/or storage engine(s) 306) that is operating on the DR site 106. In some embodiments, an identification module 512 can identify an available device on the DR site 106 that is operating and/or processing data at the fastest speed and/or rate. In further embodiments, the identification module 512 can notify a copy module 514 of the identity of the fastest available device on the DR site 106.

A copy module 514 may include any suitable hardware and/or software that can copy data stored/mirrored on the DR site 106 to a device on the DR site 106 for processing therein. In some embodiments, a copy module 514 can identify data stored/mirrored on the DR site 106 (e.g., in storage device(s) 302) that matches the batched data transferred from the production site 104 to the DR site 106. In additional or alternative embodiments, a copy module 514 can copy the data stored/mirrored on the DR site 106 to the fastest available device on the DR site 106, as identified by the identification module 512, for processing by the fastest available device.

A processing module 516 may include any suitable hardware and/or software that can process, assist in processing, and/or facilitate processing batched data on the DR site 106. In some embodiments, a processing module 516 works in conjunction with the fastest available device on the DR site 106 to process the data mirrored on the DR site 106 that corresponds to the data batch or data batches allocated and transmitted from the production site 104 to the DR site 106.

The processing module 516 can perform (e.g., via the fastest available device on the DR site 106) any suitable process or processes on the data mirrored on the DR site 106 that is known or developed in the future to transform the data in the workload. In various embodiments, the processing module 516 can perform a data sorting process, a data merging process, a data copying process, a data analysis process, a process that uses data on a disk at the DR site 106 and modifies/alters the data and/or performs one or more operations against the data, any data manipulation process that can be performed on the DR site 106, a process that maintain data in one or more databases, a process that performs large-scale operations across one or more table spaces (e.g., IBM® DB2® utilities developed by International Business Machines (IBM) Corporation of Armonk, N.Y.), and/or a data reporting process, etc., among other data processes that are possible and contemplated herein. In some embodiments, the processing module 516 can perform and/ or invoke a DFSORT process developed by IBM Corporation, among other data processes that are possible and contemplated herein.

Once processing/transformation is completed, the processing module 516 can notify a transfer module 510 that the processed/transformed data is prepared for transfer/transmission to the production site 104. Further, the processing module 516 can notify a storage module 518 that the processed/transformed data is prepared for storage on the production site 104 and/or the DR site 106.

A storage module 518 may include any suitable hardware and/or software that can store data on the production site 104 and/or the DR site 106. In various embodiments, a storage module 518 can store and/or facilitate storing the data processed/transformed via the processing module 516 on the production site 104 and/or on the DR site 106.

In storing the processed/transformed data on the production site 104, the storage module 518 operates in conjunction with the transfer module 510 and the storage engine(s) 206 to transfer and store the processed/transformed data to one or more storage devices 202 on the production site 104. In storing the processed/transformed data on the DR site 106, the storage module 518 operates in conjunction with the storage engine(s) 306 to store the processed/transformed data to one or more storage devices 302 on the DR site 104.

In some embodiments, the storage module 518 and/or storage engine(s) 306 ensure that the processed/transformed data is stored to one or more storage devices 302 on the DR site 106 that are not mirroring/storing the data corresponding to the data in the portion of the workload that was allocated to the DR site 106. In other words, the processed/transformed data is stored on a different storage device 302 on the DR site 106 than the storage device 302 that is storing the mirrored data (e.g., a copy of the original data stored on the production site 104 or base data) that was copied from the DR site 106 onto the DR site 106, via a copy module 514, and subsequently processed on the DR site 106, via a process module 516, to generate the processed/transformed data.

Figure 6:
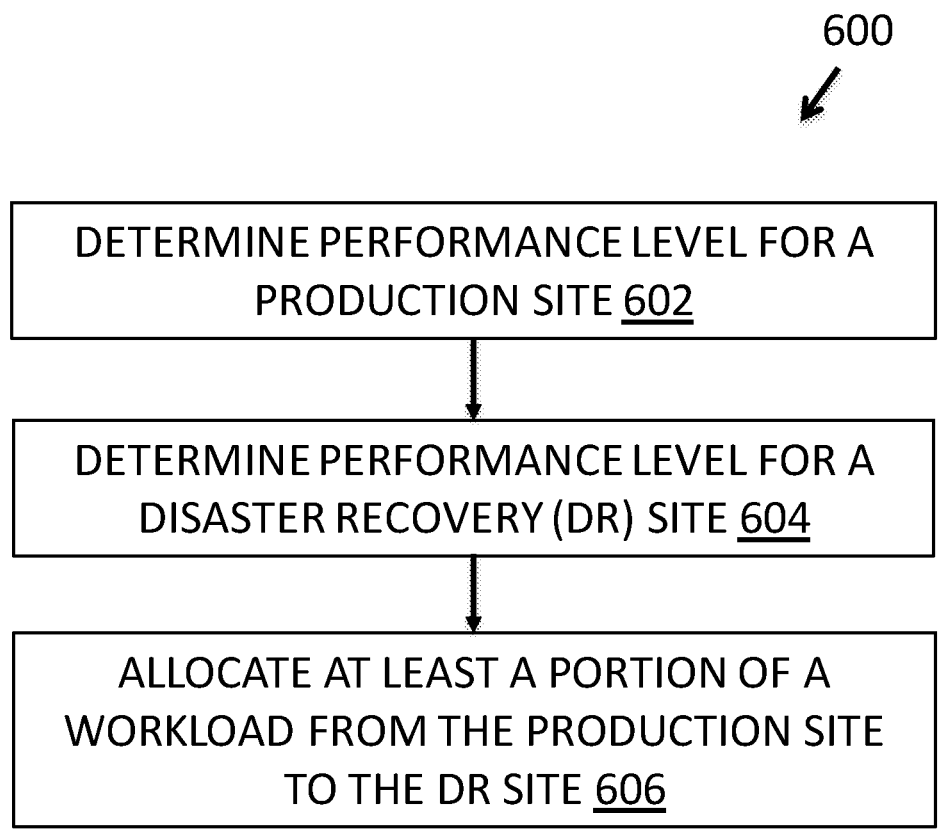
FIG. 6 is a schematic flow chart diagram of one embodiment of a method for batch processing data on a DR site.

With reference to FIG. 6, FIG. 6 is a schematic flow chart diagram illustrating one embodiment of a method 600 for batch processing data on a disaster recovery site or remote system. At least in the illustrated embodiment, the method 600 begins by a processor 402A or processor 402B (also simply referred individually, in various groups, or collectively as processor(s) 402) determining a performance level for a production site 104 (block 602) and determining a performance level for a DR site 106 (block 604).

The processor 402 further allocates at least a portion of a workload from the production site 104 to the DR site 106 (block 606). In some embodiments, the portion of the workload may be allocated from the production site 104 to the DR site 106 in response to determining that a set of predetermined parameters related to the performance level of the production site 104 is satisfied. In additional or alternative embodiments, the portion of the workload may be allocated from the production site 104 to the DR site 106 in response to determining that a set of predetermined parameters related to the performance level of the DR site 106 is satisfied.

Figure 7:
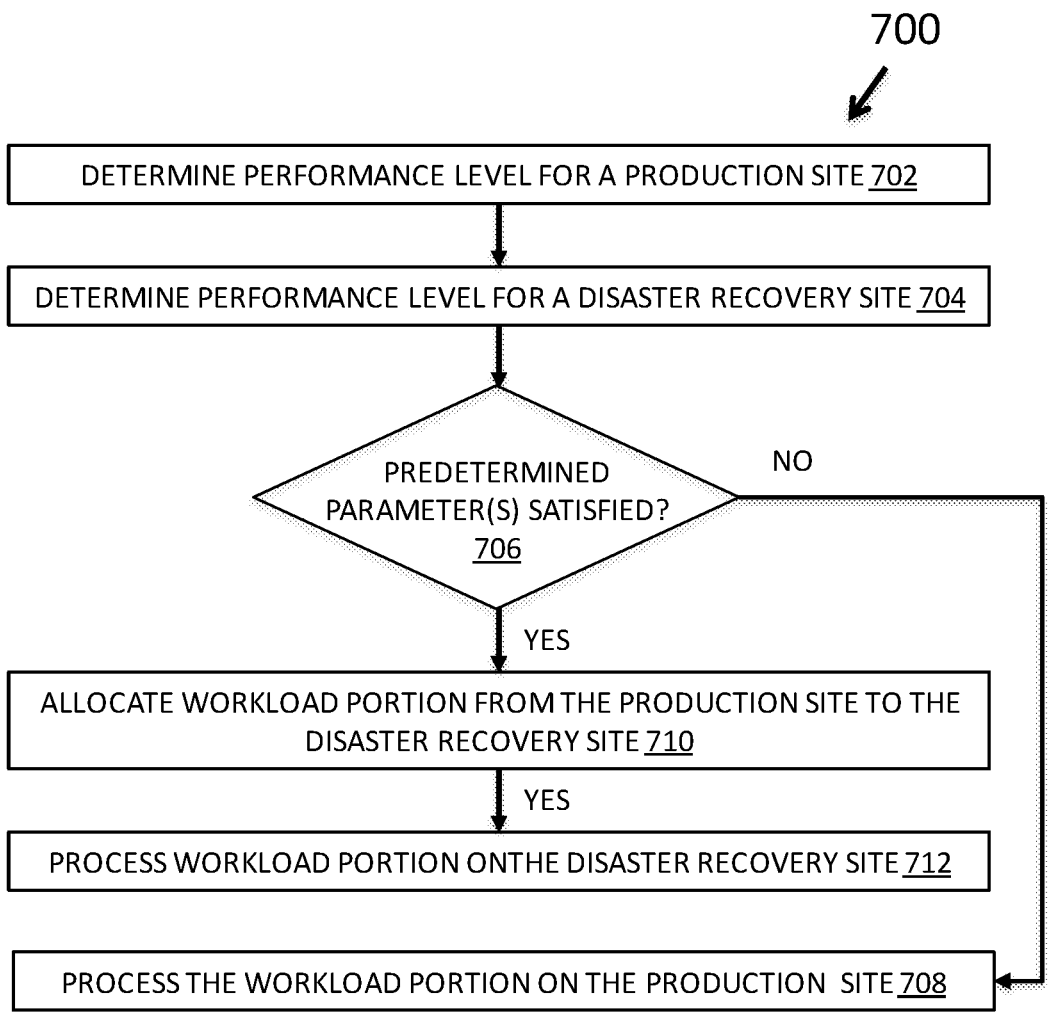
FIG. 7 is a schematic flow chart diagram of another embodiment of a method for batch processing data on a DR site.

Referring to FIG. 7, FIG. 7 is a schematic flow chart diagram illustrating another embodiment of a method 700 for batch processing data on a disaster recovery site or remote system. At least in the illustrated embodiment, the method 700 begins by a processor 402 determining a performance level for a production site 104 (block 702) and determining a performance level for a DR site 106 (block 704).

The processor 402 further determines whether a set of predetermined parameters related to the production site 104 and/or the DR site 105 is satisfied (block 706). The set of predetermined parameters may include any one or more of the predetermined parameters (e.g., metric and/or non-metric) discussed elsewhere herein. Further, whether a set of predetermined parameters is satisfied or not satisfied may be determined utilizing any of the analyses discussed elsewhere herein.

In response to the set of predetermined parameters not being satisfied (e.g., a NO in block 706), the processor 402 processes the portion of the workload on the production site 104 (block 708). In other words, a portion of the workload is not transferred from the production site 104 to the DR site 106 and/or the workload is maintained on the production site 104.

In response to the set of predetermined parameters being satisfied (e.g., a YES in block 706), the processor 402 allocates a portion of the workload from the production site 104 to the DR site 106 (block 710). The portion of the workload may then be processed and/or transformed by the DR site 106 (block 712).

Figure 8:
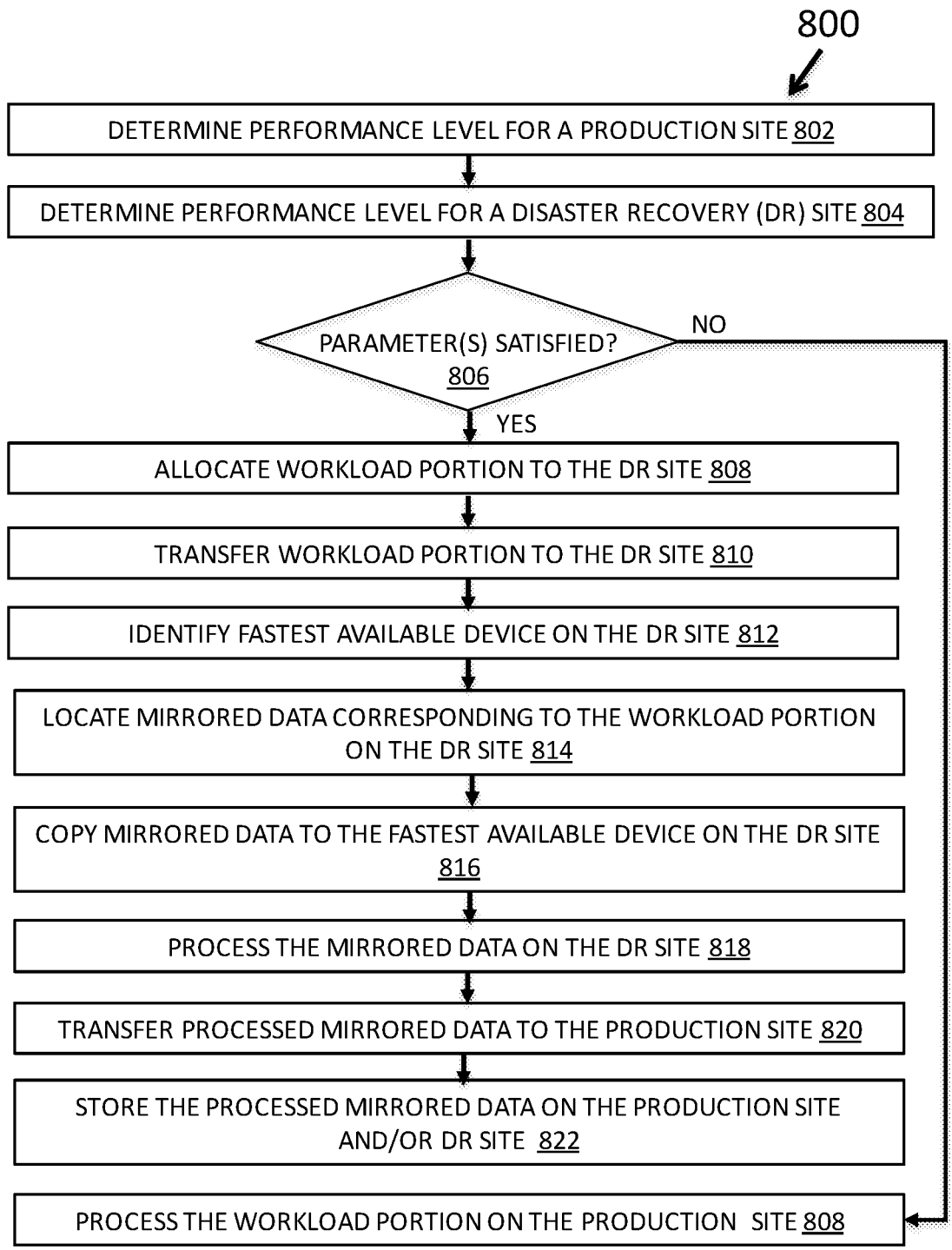
FIG. 8 is a schematic flow chart diagram of yet another embodiment of a method for batch processing data on a DR site.

With reference to FIG. 8, FIG. 8 is a schematic flow chart diagram illustrating yet another embodiment of a method 800 for batch processing data on a disaster recovery site or remote system. At least in the illustrated embodiment, the method 800 begins by a processor 402 determining a performance level for a production site 104 (block 802) and determining a performance level for a DR site 106 (block 804).

The processor 402 further determines whether a set of predetermined parameters related to the production site 104 and/or the DR site 105 is satisfied (block 806). The set of predetermined parameters may include any one or more of the predetermined parameters (e.g., metric and/or non-metric) discussed elsewhere herein. Further, whether a set of predetermined parameters is satisfied or not satisfied may be determined utilizing any of the analyses discussed elsewhere herein.

In response to the set of predetermined parameters not being satisfied (e.g., a NO in block 806), the processor 402 processes the portion of the workload on the production site 104 (block 808). In other words, a portion of the workload is not transferred from the production site 104 to the DR site 106 and/or the workload is maintained on the production site 104.

In response to the set of predetermined parameters being satisfied (e.g., a YES in block 806), the processor 402 allocates a portion of the workload from the production site 104 to the DR site 106 (block 810). The processor 402 then transfers the workload portion from the production site 104 to the DR site 106 (block 812).

The fastest available device on the DR site 106 is identified by the processor (block 814). Data mirrored/stored on the DR site 106 that corresponds to the transferred workload portion is located (block 814) and copied to the fastest available device on the DR site 106 (block 816). The processor 402 then processes and/or transforms the copied mirrored data (block 818), which can include any of the data processes and/or data transformations discussed elsewhere herein.

The processor 402 further transfers the processed/transformed data from the DR site 106 to the production site 104 (block 820). The processed/transformed data is stored on the production site 104 and/or on the DR site 106 (block 822).

The embodiments may be practiced in other specific forms. The described embodiments are to be considered in all respects only as illustrative and not restrictive. The scope of the technology is, therefore, indicated by the appended claims rather than by the foregoing description. All changes which come within the meaning and range of equivalency of the claims are to be embraced within their scope.

What is claimed is:

1. An apparatus, comprising:
a performance module that:
    determines a first performance level for a production site based on a set of first resources for the production site, and
    determines a second performance level for a disaster recovery (DR) site based on a set of second resources for the DR site;
a workload module that:
    allocates a portion of a workload scheduled for processing on the production site to the DR site for processing on the DR site in response to determining that a set of predetermined parameters related to one of the first performance level, the second performance level, and both the first performance level and the second performance level is satisfied;
an identification module that identifies an available device on the DR site with a fastest current processing time with respect to other available devices on the DR site; and
a copy module that:
    facilitates locating data mirrored on the DR site that corresponds to the portion of the workload, and
    facilitates copying the mirrored data to the identified available device on the DR site,
wherein at least a portion of said modules comprise one or more of a set of hardware circuits, a set of programmable hardware devices, and executable code stored on a set of non-transitory computer-readable storage media.

2. The apparatus of claim 1, further comprising:
a metrics module that:
    facilitates determining a set of first metrics for the production site that correspond to the first performance level for the production site, and
    facilitates determining a set of second metrics for the DR site that correspond to the second performance level for the DR site; and
a parameter module that determines whether the set of predetermined parameters is satisfied,
wherein one of:
    the set of first metrics corresponds to one or more parameters in the set of predetermined parameters,
    the set of second metrics corresponds to one or more parameters in the set of predetermined parameters, and
    the set of first metrics and the set of second metrics correspond to one or more parameters in the set of predetermined parameters.

3. The apparatus of claim 2, wherein the set of predetermined parameters comprises one or more of:
    one or more second devices on the DR site currently include a greater amount of processing bandwidth than one or more first devices on the production site;
    one or more third devices on the production site are operating at a processing rate that is less than or equal to a threshold processing rate;

a quantity of communication channels between the production site and the DR site is greater than or equal to a threshold quantity of communication channels;

a data transfer rate between the production site and the DR site is greater than or equal to a threshold transfer rate;

an amount of storage space available on the DR site is greater than or equal to an amount of storage space consumed by the portion of the workload;

the DR site includes a greater amount of available storage than the production site;

a set of first storage devices on the DR site that is separate from a set of second storage devices on the DR site that is mirroring second data corresponding to first data in the portion of the workload includes available storage space for storing the first data in the portion of the workload; and processing the portion of the workload on the DR site currently consumes less time than processing the portion of the workload on the production site.

4. The apparatus of claim 1, further comprising:

a parameter module that determines whether the set of predetermined parameters is satisfied, wherein the set of predetermined parameters comprises one or more of:
  a determination that a first priority level assigned to a type of client associated with the portion of the workload is one greater than or equal to a threshold priority level;
  a determination that a second priority level assigned to a particular client associated with the portion of the workload is one greater than or equal to a threshold priority level;
  a determination that a third priority level assigned to a type of data in the portion of the workload is one greater than or equal to a threshold priority level;
  a determination that a fourth priority level assigned to particular data in the portion of the workload is one greater than or equal to a threshold priority level;
  a determination that processing the portion of the workload on the DR site maintains one or more service level agreements (SLAs); and
  a determination that processing the portion of the workload on the DR site maintains a set of policy-based operations for one of the production site, the DR site, and both the production site and the DR site.

5. The apparatus of claim 1, further comprising:

a transfer module that facilitates transferring the portion of the workload from the production site to the DR site in response to allocating the portion of the workload to the DR site.

6. The apparatus of claim 5, further comprising:

a process module that facilitates processing the mirrored data that is copied to the identified available device on the DR site.

7. The apparatus of claim 6, wherein, in facilitating processing of the mirrored data, the process module is configured to facilitate performing one of a sort process, a data batch process, and both the sort process and the data batch process.

8. The apparatus of claim 6, wherein:

the transfer module is further configured to facilitate transferring the processed mirrored data from the DR site to the production site; and the apparatus further comprises a storage module that facilitates storing the processed mirrored data on the production site.

9. The apparatus of claim 1, wherein the workload module is further configured to process the portion of the workload on the production site in response to determining that the set of predetermined parameters is not satisfied.

10. The apparatus of claim 1, wherein the apparatus resides on one of the production site and the DR site.

11. A method, comprising:

determining, by a processor, a first performance level for a production site based on a set of first resources for the production site;

determining a second performance level for a disaster recovery (DR) site based on a set of second resources for the DR site;

allocating a portion of a workload scheduled for processing on the production site to the DR site for processing on the DR site in response to determining that a set of predetermined parameters related to one of the first performance level, the second performance level, and both the first performance level and the second performance level is satisfied;

identifying an available device on the DR site with a fastest current processing time with respect to other available devices on the DR site;

locating data mirrored on the DR site that corresponds to the portion of the workload; and copying the mirrored data to the identified available device on the DR site.

12. The method of claim 11, further comprising:

transferring the portion of the workload from the production site to the DR site in response to allocating the portion of the workload to the DR site.

13. The method of claim 12, further comprising:

processing the mirrored data that is copied to the identified available device on the DR site, wherein processing the mirrored data comprises performing one of a sort process, a data batch process, and both the sort process and the data batch process.

14. The method of claim 13, further comprising:

transferring the processed mirrored data from the DR site to the production site; and storing the processed mirrored data on the production site.

15. The method of claim 11, further comprising:

processing the portion of the workload on the production site in response to determining that the set of predetermined parameters is not satisfied.

16. A computer program product comprising a computer-readable storage medium including program instructions embodied therewith, the program instructions executable by a processor to cause the processor to:

determine a first performance level for a production site based on a set of first resources for the production site;

determine a second performance level for a disaster recovery (DR) site based on a set of second resources for the DR site;

allocate a portion of a workload scheduled for processing on the production site to the DR site for processing on the DR site in response to determining that a set of predetermined parameters related to one of the first performance level, the second performance level, and both the first performance level and the second performance level is satisfied;

identify an available device on the DR site with a fastest current processing time with respect to other available devices on the DR site;

locate data mirrored on the DR site that corresponds to the portion of the workload; and copying the mirrored data to the identified available device on the DR site.

17. The computer program product of claim 16, wherein the program instructions further cause the processor to:
transfer the portion of the workload from the production site to the DR site in response to allocating the portion of the workload to the DR site.

18. The computer program product of claim 17, wherein the program instructions further cause the processor to:
process the mirrored data that is copied to the identified available device on the DR site,
wherein processing the mirrored data comprises performing one of a sort process, a data batch process, and both the sort process and the data batch process.

19. The computer program product of claim 18, wherein the program instructions further cause the processor to:
transfer the processed mirrored data from the DR site to the production site; and
store the processed mirrored data on the production site.

20. The computer program product of claim 16, wherein the program instructions further cause the processor to:
process the portion of the workload on the production site in response to determining that the set of predetermined parameters is not satisfied.

* * * * *